United States Patent [19]

Foster et al.

[11] Patent Number: 5,762,152
[45] Date of Patent: Jun. 9, 1998

[54] MOVABLE CONVEYOR

[75] Inventors: Raymond Keith Foster, P.O. Box 1, Madras, Oreg. 97741; John S. Cook, Madras, Oreg.

[73] Assignee: Raymond Keith Foster, Madras, Oreg.

[21] Appl. No.: 606,609

[22] Filed: Feb. 26, 1996

[51] Int. Cl.⁶ .................................................. B62D 57/032
[52] U.S. Cl. ........................................... 180/8.5; 180/8.6
[58] Field of Search .......................... 180/7.1, 8.1, 8.5, 180/8.6

[56] References Cited

U.S. PATENT DOCUMENTS

| | | | |
|---|---|---|---|
| 3,135,345 | 6/1964 | Scruggs | 180/8.6 |
| 3,527,313 | 9/1970 | Reimann | 180/8.5 |
| 3,576,225 | 4/1971 | Chambers | 180/8 |
| 3,796,276 | 3/1974 | Maeda | 180/8.5 |
| 3,866,425 | 2/1975 | Morrice | 180/8.5 X |
| 3,871,534 | 3/1975 | Bursk | 214/83.3 |
| 4,095,661 | 6/1978 | Sturgas | 180/8.6 |
| 4,121,679 | 10/1978 | March | 180/8.5 |
| 4,324,302 | 4/1982 | Rabinovitch | 180/8.5 |
| 4,462,476 | 7/1984 | Shkolnik | 180/8.6 |
| 4,832,168 | 5/1989 | Farmer | 180/8.6 X |
| 5,193,661 | 3/1993 | Foster | 198/750 |
| 5,350,054 | 9/1994 | Foster | 198/750 |
| 5,427,229 | 6/1995 | Foster | 198/750 |

FOREIGN PATENT DOCUMENTS

| | | | |
|---|---|---|---|
| 1137164 | 1/1985 | U.S.S.R. | 180/8.5 |
| 882911 | 11/1961 | United Kingdom | 180/8.6 |

OTHER PUBLICATIONS

Basil Peters, "The 'Brute Force' Method", Hovering Craft and Hydrofoil, pp. 4–7, Jan. 1977.

Primary Examiner—Kevin Hurley
Attorney, Agent, or Firm—Joan H. Pauly; David P. Campbell

[57] ABSTRACT

A movable conveyor (10) comprising a platform (24) for carrying a soccer field (12) or the like, and pairs of sled assemblies (26). Each sled assembly (26) includes a shoe (42), a pair of linear hydraulic motors or actuators (60, 62), a plastic bearing (79), and an expandable air bag (83). Air bag (83) inflates to raise platform (24), while actuators (60, 62) operate to move platform (24) along shoe (42). With air bag (83) deflated, platform (24) rests on a foot support (38). This allows actuators (60, 62) to reposition shoe 42 to a forward position, to again raise and move platform (24).

17 Claims, 9 Drawing Sheets

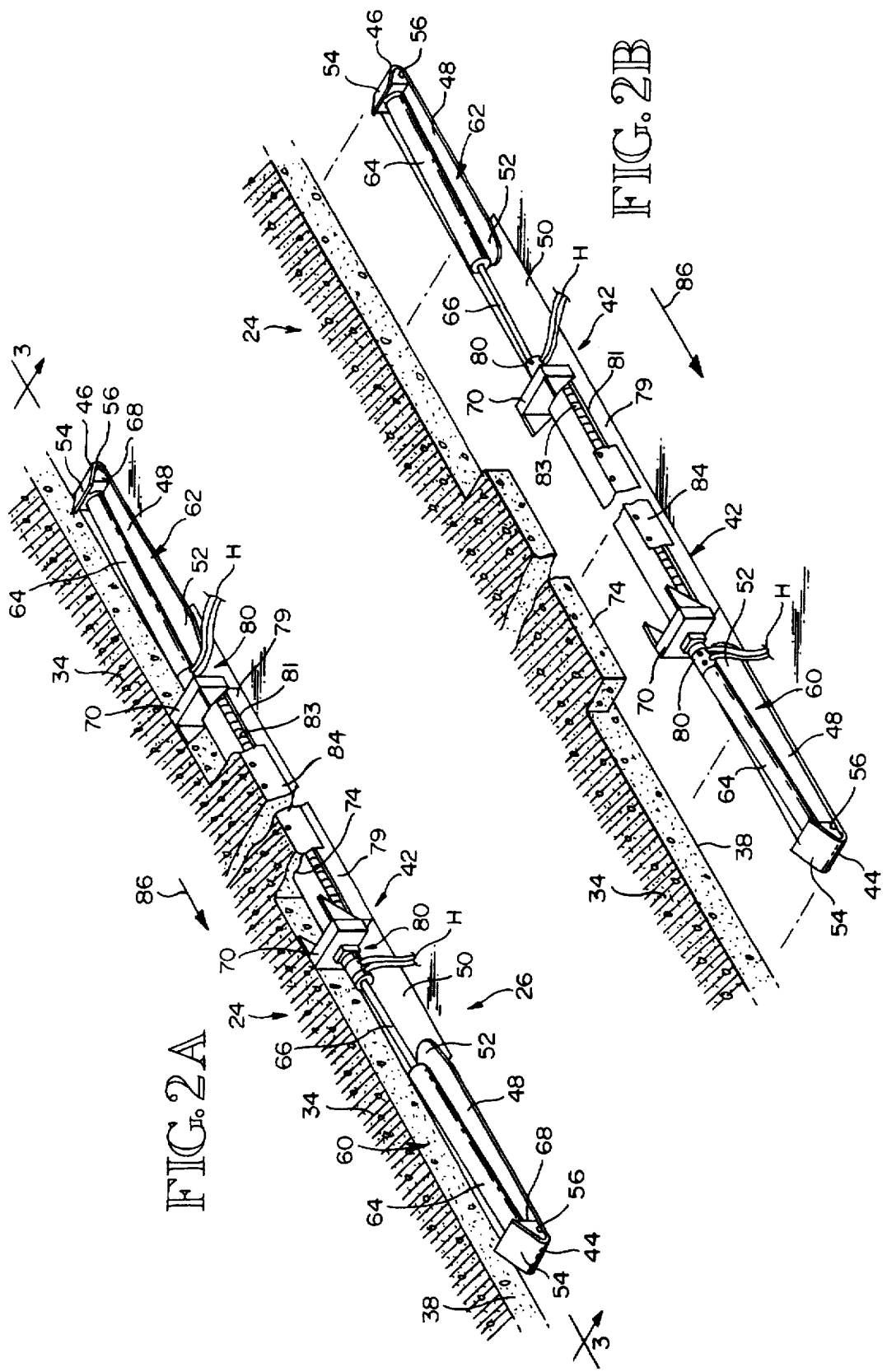

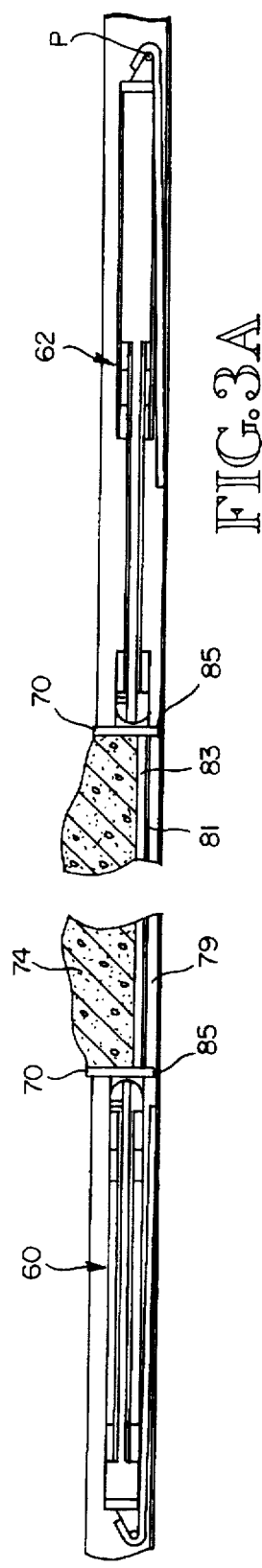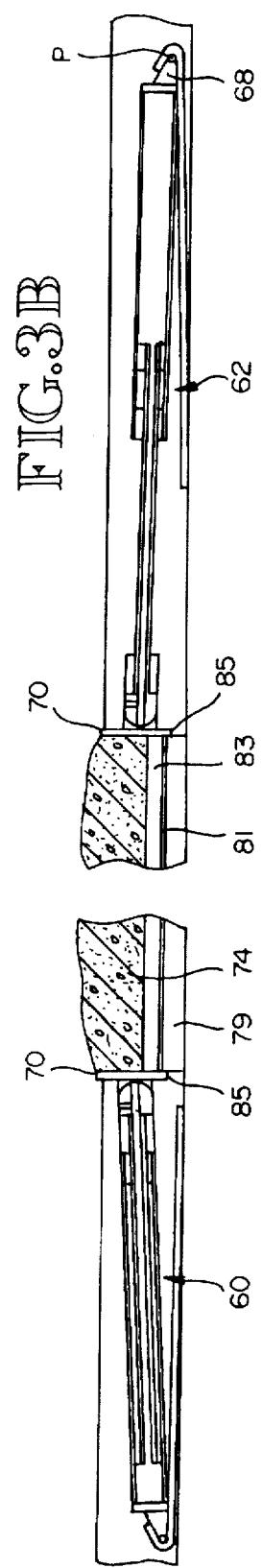

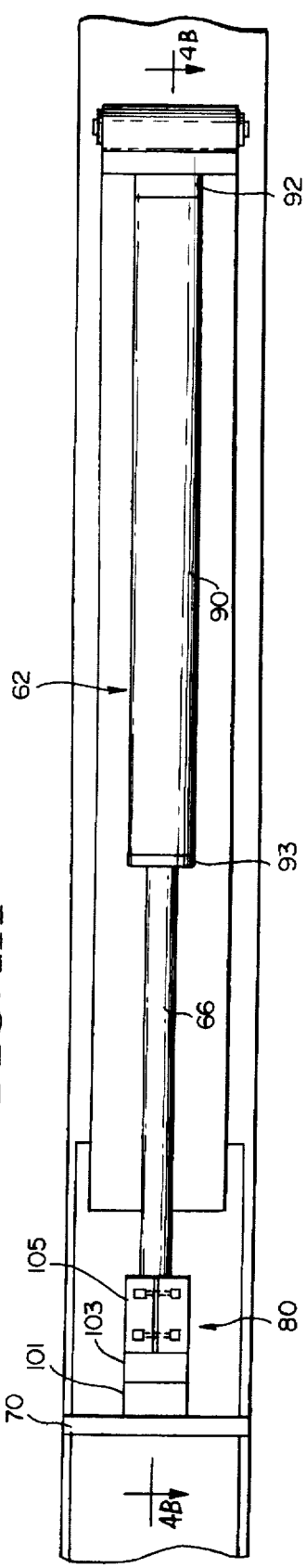
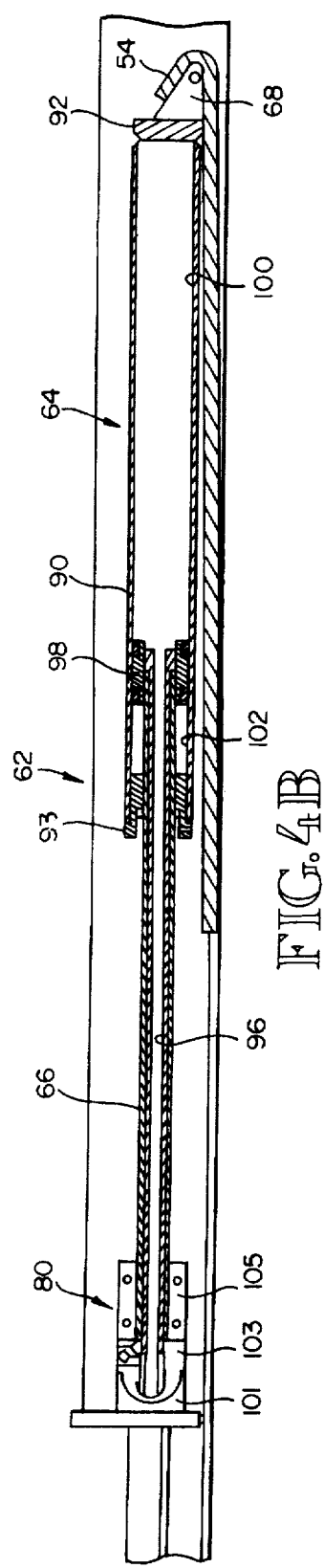
FIG. 4A
FIG. 4B

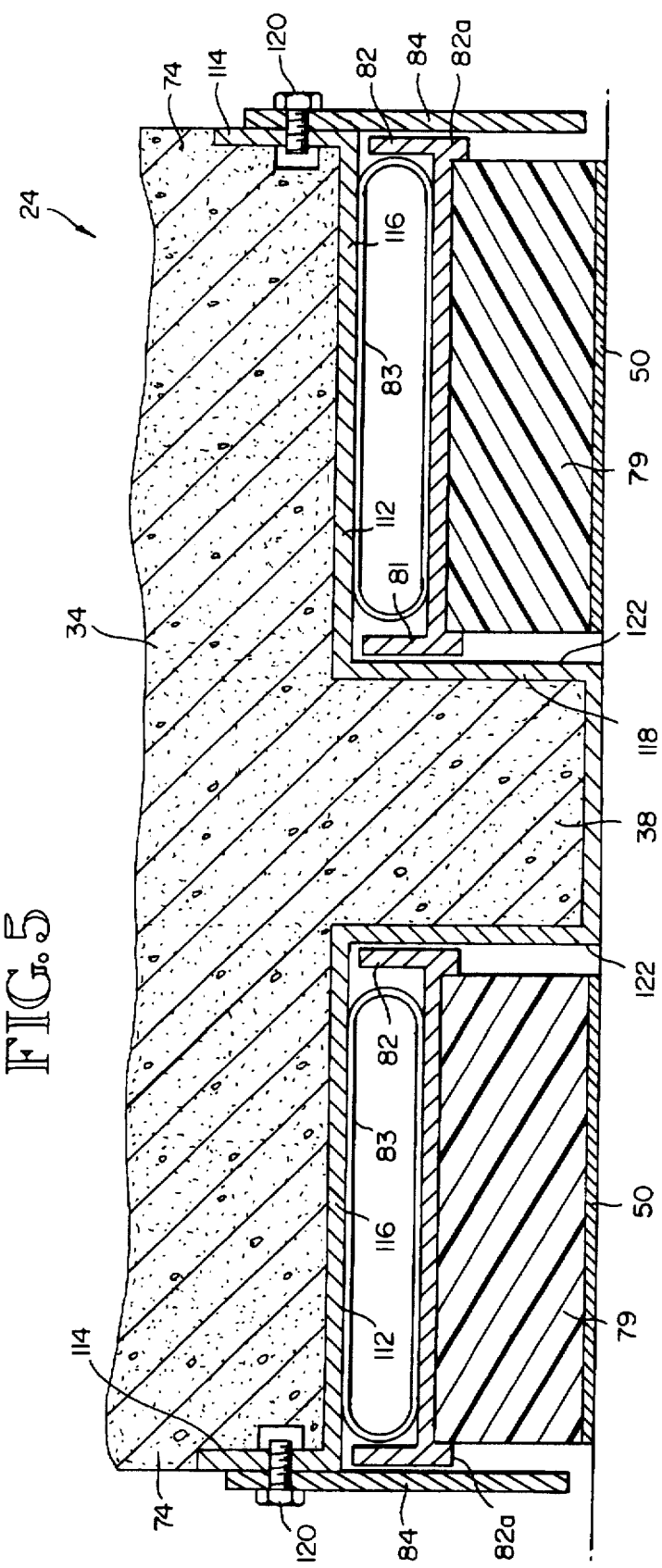

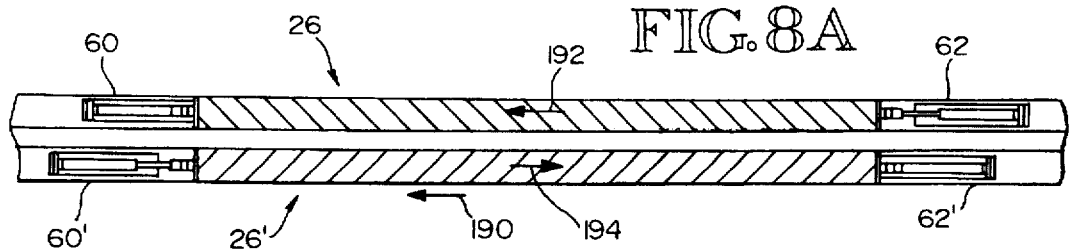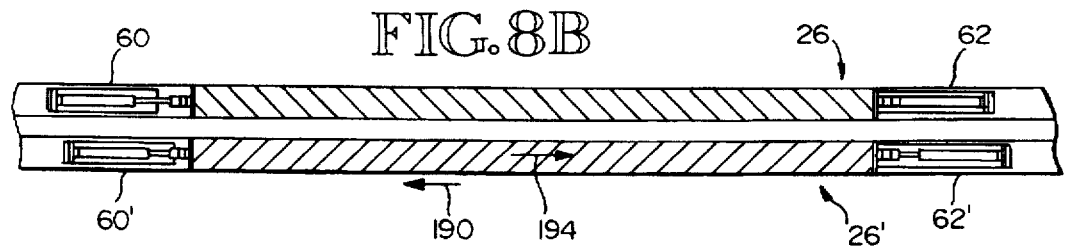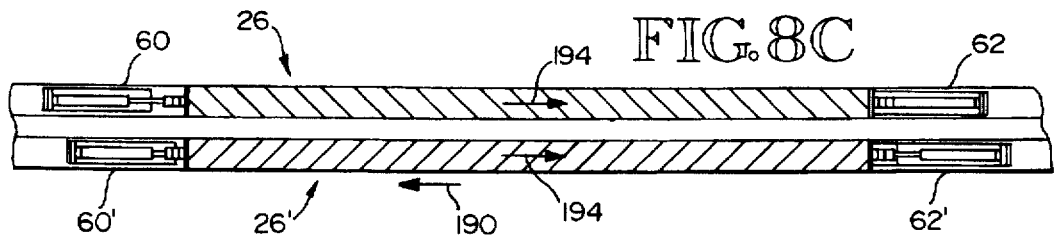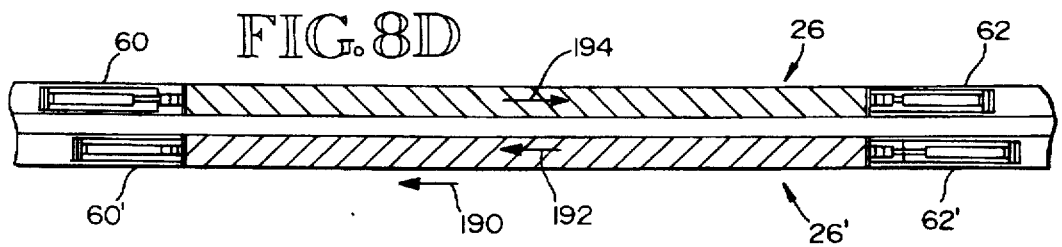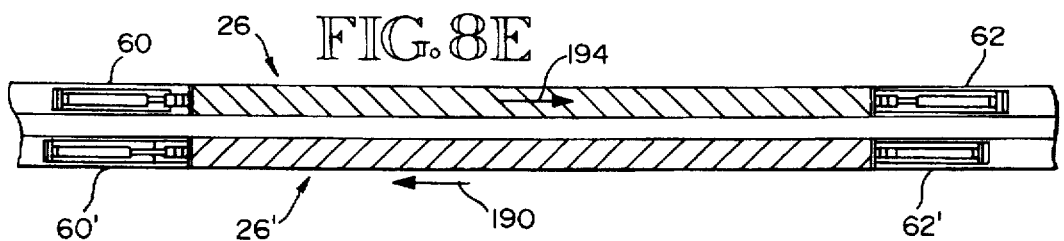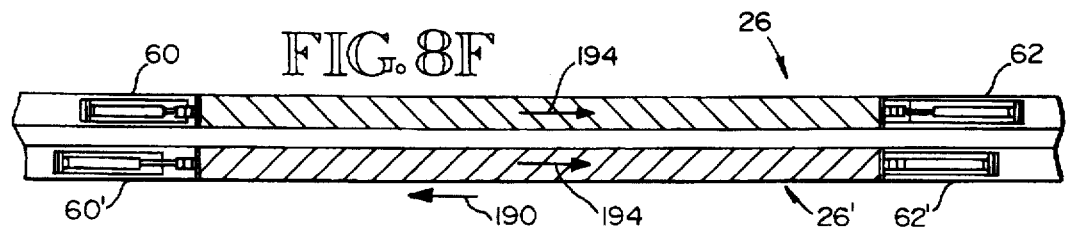

5,762,152

1

MOVABLE CONVEYOR

TECHNICAL FIELD

The present invention pertains to movable conveyors capable of carrying a load across a surface.

BACKGROUND OF THE INVENTION

Natural grass fields are desirable for sporting events for many reasons. Two primary reasons are that they tend to reduce injuries and they are more traditional than fields covered with artificial surfaces, such as the material sold under the registered trademark "ASTROTURF." However, it is preferable to stage many sporting events indoors, generally due to weather conditions, where growing grass has proven difficult. To achieve both, stadiums have been proposed with retractable roofs, such as the new baseball stadiums for the expansion Phoenix, Ariz., U.S.A. major league baseball team and the Seattle Mariners in Seattle, Wash., U.S.A. The retractable roofs, in a closed position, provide protection from the elements and, in an open position, expose the grass to sunshine.

Since retractable roof stadiums are expensive, it occurred to the applicant that another possible solution would be to move a natural grass field into and out of a domed stadium. While in the dome, the grass field would provide the benefits of natural grass in an enclosed arena, and while outside the stadium, the grass would have the opportunity to grow in a more natural environment. The present invention is directed to solving the problem of moving the grass field into and out of a domed stadium.

DISCLOSURE OF THE INVENTION

A subject of the present invention is a movable conveyor for conveying a load in a longitudinal direction. According to an aspect of the invention, the conveyor comprises a platform having a load-receiving surface, and a shoe positioned below the platform. An expandable member is positioned vertically between the platform and the shoe and is mounted to move longitudinally with the platform. An extensible actuator has first and second components movable relative to each other. One component is coupled to the shoe, and the other is coupled to the platform. The expandable member has an expanded position in which it pushes upwardly on the platform, to raise the platform and any load on the platform, and pushes downwardly on the shoe to exert downward pressure on the shoe and inhibit longitudinal movement of the shoe when the actuator is operated to move the load. The expandable member also has a contracted position in which it allows the platform and the load thereon to rest on a support to allow the shoe to move longitudinally relative to the load when the actuator is operated.

Preferably, the movable conveyor includes first and second longitudinally spaced abutments positioned longitudinally between first and second ends of the shoe. The movable conveyor also includes first and second extensible units having one end coupled to the first and second ends of the shoe, respectively, and another opposite end coupled to the first and second abutments, respectively. The expandable member is positioned longitudinally between the first and second abutments, and one of the units comprises the actuator. Preferably, each of the extensible units comprises a powered actuator.

In the preferred embodiment of the invention, the movable conveyor comprises a pair of shoes laterally adjacent to each other, each shoe having associated therewith its own

2 first and second abutments, expandable member and first and second extensible units. Each expandable member serves, during a portion of a conveying operation, as the support to allow the shoe corresponding to the other expandable member to move longitudinally relative to the load to allow, in turn, continuous conveyance of the load in the longitudinal direction.

Preferably, a bearing is positioned vertically between the shoe and the expandable member and is mounted to move longitudinally with the expandable member. The expandable member, in its expanded position, pushes downwardly on the bearing, which, in turn, exerts a downward pressure on the shoe. The bearing provides a bearing surface for movement of the platform and the load along the shoe.

A preferred feature of the invention is a shoe that has first and second end portions defining therebetween a midsection. The first and second end portions have greater rigidity than the midsection, and the expandable member is positioned vertically adjacent the midsection. Another preferred feature is an expandable member that is inflatable and has inflated and deflated positions.

According to another aspect of the invention, the conveyor comprises a platform, a shoe, a support, means for transferring the weight of the load from the support onto the shoe, and means for moving the load and the shoe relative to each other. The load is conveyed by raising the load onto the shoe and moving the platform relative to the shoe.

Another subject of the invention is a method of operating the conveyor described above. Preferably, the method includes allowing first and second groups of expandable members to alternatively serve as the support for the load, and overlapping operation of first and second groups of actuators to move the load so that the load is conveyed continuously.

These and other aspects, features, and advantages of the present invention will become apparent from the following description of the best mode for carrying out the invention.

BRIEF DESCRIPTION OF THE DRAWINGS

Like reference numerals are used to indicate like parts throughout the various figures of the drawing, wherein:

FIGS. 2A–2B are pictorial views of sled assemblies of the movable conveyor of FIG. 1, with the sled assembly in FIG. 2B shown exploded from the soccer field support, and with portions of the concrete platform, in both views, cut-away to illustrate an abutment portion of the platform;

FIGS. 3A–3B are partially schematic section views of the sled assembly, taken along the line 3—3 of FIG. 2A, with the platform in FIG. 3B shown in a raised position;

FIG. 4A is a partially schematic enlarged detail plan view of an actuator of the sled assembly of FIG. 2A;

FIG. 4B is a partially schematic enlarged section view, taken along the line 4B—4B of FIG. 4A;

FIG. 5 is an enlarged detail section view of a pair of sled assemblies, each like the sled assembly of FIG. 2A;

FIGS. 8A–8F are a series of schematic diagrams of the sled assemblies of FIG. 1 illustrating the sequence of operation of the sled assemblies.

BEST MODE FOR CARRYING OUT THE INVENTION

Figure 1:
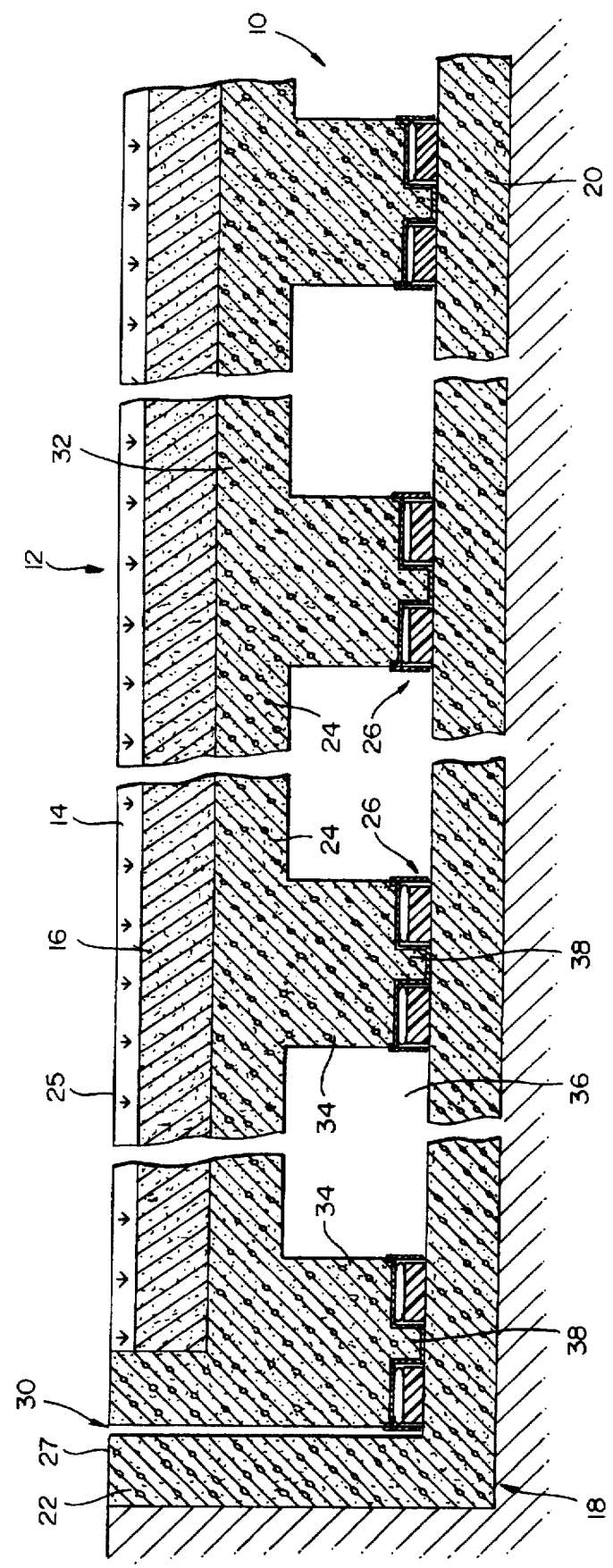
FIG. 1 is a partial sectional view of the preferred embodiment of the movable conveyor of the present invention in an installation for moving a soccer field.

In FIG. 1, the preferred embodiment of the movable conveyor 10 of the present invention is shown carrying a soccer field 12. Soccer field 12 includes a layer of grass 14 and a layer of earth and/or gravel 16. Soccer field 12 is approximately 81 meters wide and 120 meters long and movable conveyor 10 has approximately the same dimensions. However, the particular dimensions of the field or the overall dimensions of the movable conveyor are not critical to the invention. Soccer field 12 and movable conveyor 10 are housed in a concrete bunker 18 that includes a floor 20 and sidewalls 22. Bunker 18 is sunk into the ground so that soccer field 12 is substantially flush with its surrounding surface area.

Movable conveyor 10 is designed to lift and move soccer field 12 into and out of a domed arena (not shown), which preferably is equipped with an opening at one end, or perhaps a tunnel, through which movable conveyor 10 can transfer soccer field 12. Bunker 18 extends from the entire area occupied by field 12 within the arena to an area outside the arena where the field can be parked for exposure to a natural environment. In operation, movable conveyor 10 carries soccer field 12 from inside of the domed arena, out through the opening or tunnel at one end of the arena, to a parking area for the soccer field just outside the arena. The idea is for the soccer field to be moved outside of the arena to allow the grass to grow, or perhaps to stage an outdoor soccer match, and then to move the soccer field indoors so that an indoor soccer match can be played. However, the particular event, sporting or otherwise, staged on field 12 forms no part of the invention.

Movable conveyor 10 includes, generally, a concrete platform 24 and a plurality of sled assemblies 26. Platform 24 extends approximately the dimensions of soccer field 12 and may include drains to allow water to drain from field 12 into bunker 18. Sled assemblies 26 raise platform 24 off of the floor 20 of bunker 18, and then sled assemblies 26 move platform 24, along with soccer field 12, within bunker 18 into and out of the arena.

In lieu of a concrete platform 24, other types of platforms could be provided for carrying the soccer field, such as a platform comprising a rigid metal frame. All that is necessary is that a structure be provided that is capable of supporting the soccer field, or some other load, while accommodating operation of the sled assemblies.

Preferably, bunker 18 is provided with a drainage system in floor 20 to provide for easy cleaning of the bunker, as well as to provide drainage for a liquid film bearing in sled assemblies 26, discussed later. If a drainage system is provided, floor 20 should be sloped to allow water to drain, and platform 24 should be shaped accordingly.

Sidewalls 22 of bunker 18 extend around floor 20 along the sides of bunker 18, as well as along the ends (not shown) of the bunker, to form a sunken pit in which sits the movable conveyor and soccer field. When the platform 24 is in its lowered position (as shown in FIG. 1), the top surface 25 of grass 12 is flush with the upper edge 27 of sidewalls 22.

Platform 24 of movable conveyor 10 extends approximately the width of bunker 14 so that there is only a slight gap 30 of a few inches between platform 24 and sidewall 22. Preferably, a guide rail or rollers (not shown) are provided in side walls 22, extending into gap 30, to keep platform 24 moving longitudinally within bunker 18.

Platform 24 includes an upper load receiving horizontal portion 32, which receives earth and gravel 16 and grass 14 of soccer field 12. A set of downwardly projecting legs 34 support horizontal portion 32. Legs 34 are spaced across the width of platform 24, and each extends for the entire length of platform 24. Legs 34 define access tunnels 36 underneath horizontal portion 32 that also extend the length of platform 24. Platform 24 and field 12 can be provided with access hatches (not shown), to provide access to tunnels 36 from above field 12. In addition, legs 34 can be provided with crossover doors or openings (not shown) to allow maintenance personnel to move from one access tunnel to an adjacent access tunnel.

Each leg 34 includes a foot support 38, which extends downwardly between a pair of sled assemblies 26. Each foot support 38 functions as a support for movable conveyor 10 and field 12 when platform 24 is in its lowered position and is carrying the full weight of field 12.

FIGS. 2A and 2B each detail a sled assembly 26. Each sled assembly 26 includes an elongated shoe 42 having a first end 44 and a second end 46. Shoe 42 includes a pair of longitudinally spaced formed shoe pieces 48, one at each of its ends 44, 46, joined together by an elongated intermediate shoe piece 50. Formed shoe pieces 48 have a thickness greater than intermediate shoe piece 50 and, thus, are more rigid members. Shoe pieces 48 are secured, preferably by welding, at junctions 52 to intermediate shoe piece 50. At their respective first and second ends 44, 46, formed shoe pieces 48 include an inwardly upturned end 54, which forms an angular socket 56. Preferably, shoe pieces 48, 50 are made of stainless steel.

According to the invention, each sled assembly 26 also includes an extensible actuator. In the illustrated preferred embodiment, the actuator includes first and second linear hydraulic motors 60, 62. Alternatively, sled assembly 26 could have a single extensible unit in the form of a linear motor or two extensible units, only one of which is powered. In the preferred embodiment, both units are powered motors, and each motor 60, 62 includes a cylinder component 64 and a piston component 66. Steel wedge blocks 68 mount to cylinder components 64 near outer ends 44, 46 of shoe 42. Blocks 68 are wedge-shaped to conform with angled sockets 56. Preferably, blocks 68 are wedged into sockets 56. The block mount allows a few degrees of pivotal moment of the cylinder component 64 relative to shoe pieces 48, 50 about a pivot axis P, as illustrated in FIGS. 3A, 3B.

Referring to FIGS. 2A, 2B, 3A, and 3B, piston components 66 are each joined at their inner ends to a transverse mounting block 70. Transverse mounting blocks 70 are longitudinally spaced and are secured to the opposite ends of an abutment 74. Abutment 74 is made of concrete and extends laterally from foot support 38 and downwardly from leg 34 and is formed integrally with both. Alternatively, rather than a single abutment extending between mounting blocks 70, a pair of spaced abutments can be provided, with each abutment adjacent a mounting block 70.

Piston components 66 are secured to transverse mounting blocks 70 by means of ball and socket mounts 80. Ball and socket mounts 80 allow piston rod components 66 to pivot in a vertical plane with respect to transverse mounting blocks 70. Ball and socket mounts 80 also provide for hydraulic connections H to and from the working chambers of motors 60, 62, and are discussed in more detail with reference to FIG. 4.

Sled assembly 26 also includes an elongated rectangular plastic slide bearing 79, preferably made of UHMW plastic. Slide bearing 79 slidably rests on intermediate shoe piece 50. The plastic body of the bearing 79 may be provided with conduits (not shown) for channeling fluid to a space between the bottom surface of the bearing 79 and the confronting surface of the shoe, to create a fluid film therebetween. An elongated extruded aluminum hat channel 81, as best seen in FIG. 5, mounts on top of bearing 79. Hat channel 81 carries an expandable air bag or tube 83, which, when inflated, engages the underside of abutment 74 to lift platform 24. Consistently with the invention, another type of expandable member could be used in place of the inflatable bag 83. Bearing 79, hat channel 81, and air bag 83 extend for a length of approximately 37 feet and are discussed in more detail with reference to FIG. 5.

An elongated side plate 84 is secured on the outer side of abutment 74. Side plate 84 extends the entire length of the movable conveyor and longitudinally past first and second ends 44, 46 of shoes 42. At ends 44, 46, side plate 84 acts as a guide rail to limit outward lateral movement of ends 44, 46 and angle blocks 56 away from supports 38. In this manner, shoes 42 are confined to a longitudinal path of movement.

In FIG. 2A, motor 60 is shown in an extended position and motor 62 is shown in a retracted position. In FIG. 2B, motor 62 is extended and motor 60 is retracted. With air bag 83 inflated and sled assembly 26 supporting platform 24, extension of motor 62 causes the soccer field 12 to move in a longitudinal direction, as indicated by arrow 86 in FIGS. 2A and 2B, while shoes 42 remain stationary in contact with the bunker floor.

In FIGS. 3A–3B, abutment 74 is shown extending between transverse mounting blocks 70, with each transverse mounting block 70 abutting up against an end of abutment 74. Air bag 83 is positioned underneath abutment 74 and on top of hat channel 81. When inflated, the upper portions of air bag 83 engage the underside of abutment 74 and lift platform 24. Hat channel 81 is carried on slide bearing 79 and functions to keep air bag 83 properly positioned underneath abutment 74.

Air bag 83, hat channel 81, and slide bearing 79 each extend the distance between transverse mounting blocks 70. The bottom edge portions 85 of transverse mounting blocks 70 extend downwardly from abutment 74 to a point low enough to engage the ends of slide bearing 79, when air bag 83 is either inflated or deflated. In this manner, slide bearing 79, hat channel 81, air bag 83, transverse mounting blocks 70 and abutment 74 move as a unit, as motors 60, 62 of sled assembly 26 extend and retract to convey the platform.

In FIG. 4, the design of the second motor 62 is shown in more detail. The design of first motor 60 is identical to that of second motor 62. Cylinder component 64 includes a cylinder sidewall 90, a first end wall 92, and second end wall 93. End wall 92 is welded to sidewall 90, while end wall 93 is threaded into sidewall 90. End wall 93 includes a circular opening for passage of piston rod component 66. A piston head 98 is threadably mounted at the inner end of piston rod 66. Piston head 98 divides the interior of cylinder component 64 into a first working chamber 100 and a second chamber 102. In operation, working chamber 100 is supplied with hydraulic fluid pressure to expand motor 62. Second chamber 102 is not utilized as an active working chamber. Rather, it acts as a slave chamber in response to the introduction and evacuation of hydraulic fluid pressure into and from first working chamber 100. However, both chambers 100, 102 could be made active working chambers, in which case, wedges 68 would need to be pivotally secured to shoe ends 54. Piston head 98 and cylinder end walls 92, 93 include appropriate seals for retaining fluid in the cylinder 64 and preventing fluid communication between the two working chambers.

Piston rod 66 includes an inner passageway 96 extending its entire length for introducing hydraulic fluid into working chamber 100. The outer end of piston rod 66 is received in ball and socket mount 80. Ball and socket mount 80 is of the same general design as is disclosed in my U.S. Pat. No. 5,350,054, entitled "Ball Block for Mounting Linear Motor," and in my U.S. Pat. No. 5,193,661, entitled "System of Linear Hydraulic Motors." The mount 80 includes a socket member 101 that is mounted to transverse block 70, and an internally ported ball member 103 that is secured to rod component 66 by means of a pair of clamps 105.

In FIG. 5, a section view of a pair of sled assemblies 26 is shown approximately at the midpoint of the sled assemblies. Each sled assembly 26 includes the intermediate shoe piece 50, the elongated plastic slide bearing 79, the upper hat channel 81, and the expandable air bag 83. Hat channel 81 includes a pair of side rails 82 for keeping air bag 83 centered underneath abutment 74. Each side rail 82 has a downwardly extending lower portion 82a that abuts a side surface of the slide bearing 79 to prevent lateral movement of the hat channel 81 relative to the bearing 79.

A formed channel piece 112 is mounted to the underside of opposite abutments 74 and the foot support 38 therebetween. Formed channel piece 112 extends the width of abutments 74 and includes a pair of outer flanges 114, two inwardly-extending horizontal sections 116, and a U-shaped central portion 118, which extends downwardly along the sides and underneath the bottom of foot support 38 of leg 34. Bolts 120 secure side plates 84 to outer flanges 114. Side plates 84 extend downwardly a sufficient distance so that, with platform 24 raised, side plates 84 engage hat channels 81 and keep sled assemblies 26 confined within slots 122. Channel piece 112 and side plates 84 function as part of the platform 24.

Air bags 83 engage, along their upper surfaces, the underside of horizontal sections 116. It can be seen in FIG. 5 that side plate 84, horizontal section 116, and U-shaped central portion 118 define elongated slots 122, in which sled assemblies 26 are positioned. Hat channel 81 is slightly narrower than slot 122 to allow each sled assembly a minimal degree of lateral movement.

In operation, plastic bearing 79 slides along shoe piece 50, as platform 24 is advanced along shoe 42 in a forward direction, thereby providing a low friction engagement between stationary shoe piece 50 and the moving platform 24. As noted above, mounting blocks 70 engage the ends of bearing 79 to ensure that bearing 79 moves with platform 24.

Figure 5A:
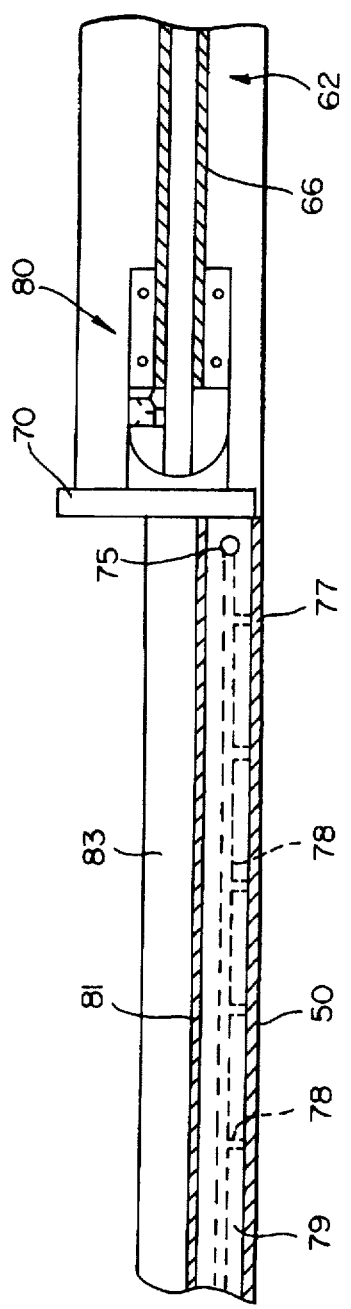
FIG. 5A is an enlarged schematic section view of the sled assembly of FIG. 3A, illustrating optional channels in the bearing piece of each sled assembly for introducing water beneath the bearing piece to create a liquid film bearing beneath the plastic bearing piece.

In an alternative embodiment as shown in FIG. 5A, a liquid film bearing 77 can be provided between plastic bearing 79 and shoe piece 50. In this embodiment, water is injected through a port 75 at one end of bearing 79, through internal passageways 78 in plastic bearing 79, and out through the bottom of bearing 79. The water escapes laterally outwardly from bearing 79. In this manner, a thin film of fluid is provided between bearing 79 and shoe piece 50, thereby further reducing frictional resistance between the two.

Figure 6:
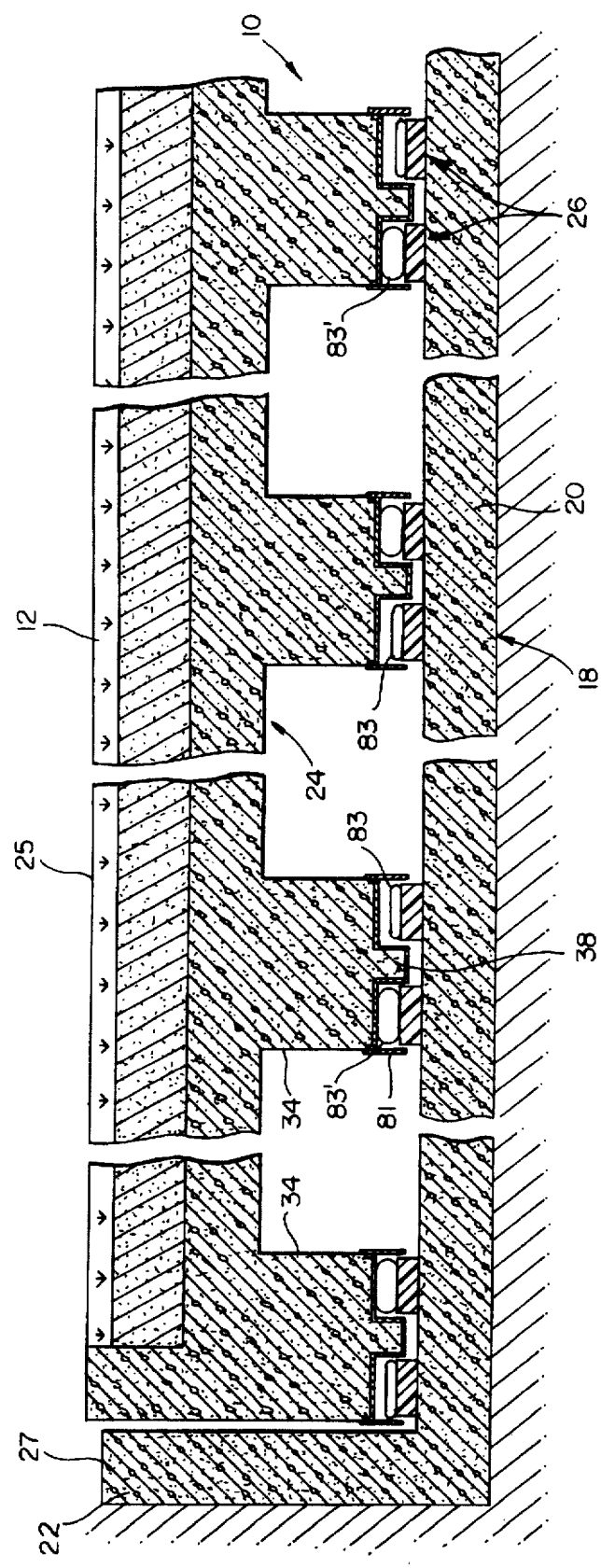
FIG. 6 is a section view like FIG. 1 shown with some of the expandable members inflated to raise the platform and lift the soccer field for transfer within a bunker.

In FIG. 6, one air bag 83' of each adjacent pair of sled assemblies 26 is shown inflated, in which condition platform 24 and field 12 are raised up off of bunker floor 20. The bottoms of foot supports 38 and U-shaped channel portions 118 are raised above bunker floor 20, and platform 24 is entirely supported by the sled assemblies with inflated air bags 83'.

At certain times during operation of movable conveyor 10, only one air bag 83' of each pair of adjacent sled assemblies 26 is inflated, while the other air bag 83 is deflated. At these points during operation, the sled assemblies with deflated air bags are unweighted, which allows them to reposition their shoes, as discussed later.

Figure 7:
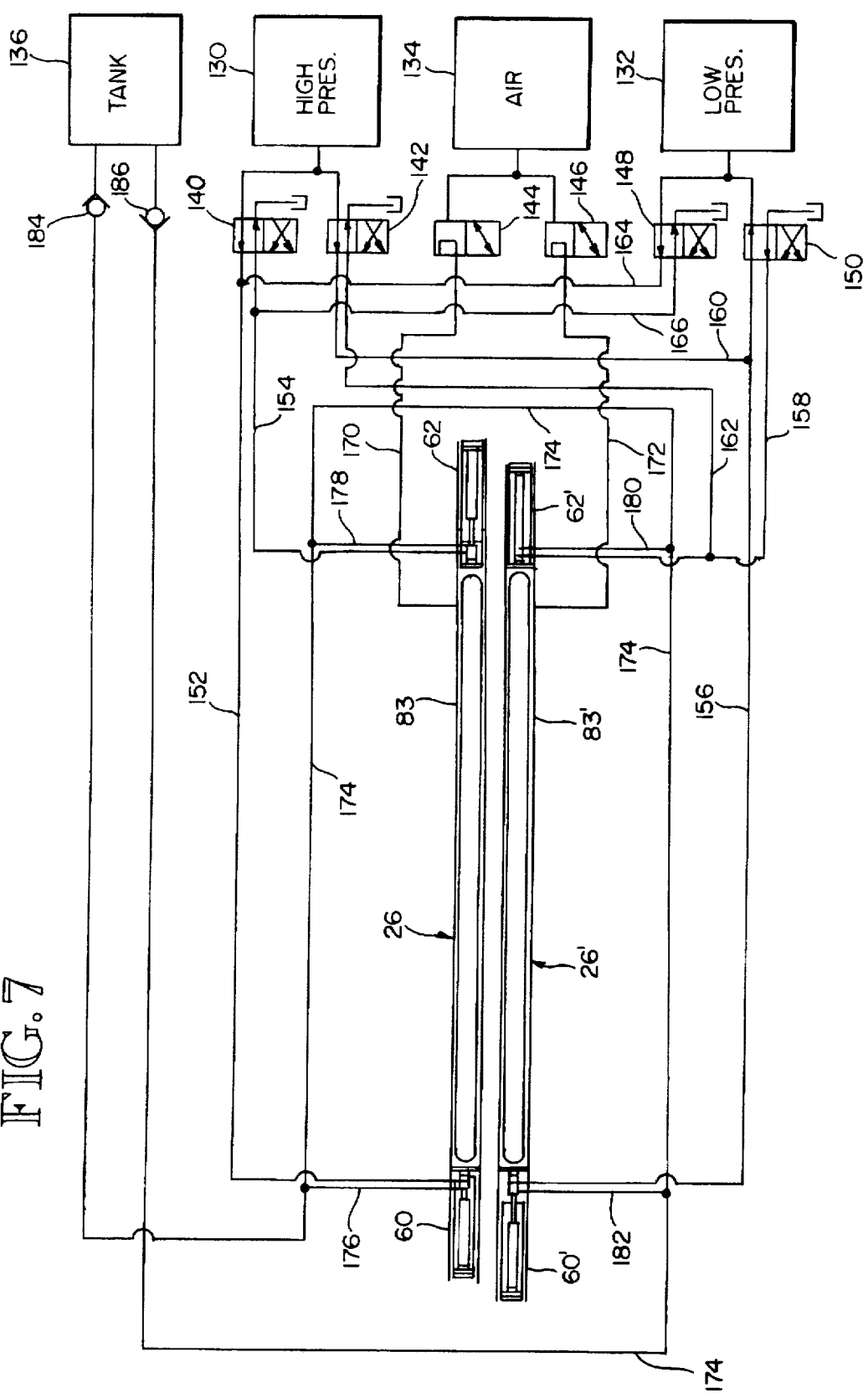
FIG. 7 is a schematic diagram of the hydraulic and pneumatic circuit for controlling operation of the movable conveyor of FIG. 1.

FIG. 7 shows a schematic circuit diagram for controlling operation of motors 60, 60', 62, 62' and air bags 83, 83' of sled assemblies 26, 26'. In FIG. 7, a single representative pair of sled assemblies 26, 26' is shown. A complete conveyor 10 preferably includes a plurality of pairs of sled assemblies 26, 26', with the exact number of pairs depending on the type of load being moved. Regardless of the number of pairs, each pair is connected to the other pairs and to the circuit elements shown in FIG. 7. The circuit includes a high pressure, low volume hydraulic fluid source 130, a low pressure, high volume hydraulic fluid source 132, a pneumatic pressure source 134, and a tank 136 for hydraulic fluid. A first pair of switching valves 140, 142 controls the flow of high pressure hydraulic fluid to the working chambers of motors 60, 60', 62, 62'. A second pair of switching valves 144, 146 controls the flow of air pressure to air bags 83, 83'. A third pair of switching valves 148, 150 controls the flow of low pressure hydraulic fluid to the working chambers of the motors.

A first high pressure line 152 connects valve 140 to the working chamber of motor 60. A second high pressure line 154 connects valve 140 to the working chamber of motor 62. A first low pressure line 156 connects valve 150 to the working chamber of motor 60'. A second low pressure line 158 connects valve 150 to the working chamber of motor 62'. Crossover lines 160, 162 connect valve 142 to low pressure lines 156, 158, respectively, and crossover lines 164, 166 connect valve 148 to high pressure lines 152, 154, respectively. High pressure lines 152, 154 are referred to as "high pressure" lines and low pressure lines are referred to as "low pressure" lines merely for convenience. The actual pressure in the lines changes depending on the positions of valves 140, 142, 148, and 150. Each of the valves 140, 142, 148, and 150 can connect either of the lines associated therewith to tank. Each valve 140, 142, 148, 150 also has an off position (not shown) so that it can block its connections to tank and its associated pressure source from the associated lines to permit connection of the lines to one of the pressure sources 130, 132 but not the other.

A first pneumatic line 170 connects valve 144 to air bag 83. A second pneumatic line 172 connects valve 146 to air bag 83'. A return loop 174 connects to return lines 176, 178, 180, 182 and leads to tank 136. A pair of check valves 184, 186 are provided in return loop 174 to ensure one way return flow through loop 174 to tank 136.

Valves 140, 142, 144, 146, 148, 150 are solenoid controlled switching valves. It is believed that the electronic circuitry for controlling valves 140-150 is well within the understanding of one skilled in the art and will not be discussed herein. Switching valves 140 and 142 are operated to control the flow of hydraulic pressure to the working chambers of motors 60, 62, 60', 62'. In each hydraulic motor, only working chamber 100 (FIG. 4B) can be connected to pressure. Thus, the motor is only powered to extend. The motor retracts when its working chamber 100 is relieved to tank and the other motor in the same sled assembly is powered to extend. During operation, only one hydraulic motor of each sled assembly is pressurized at any given time. The sequencing of the steps of a conveying operation can be accomplished automatically through the use of abutments carried by the motors 60, 62, 60', 62' and/or other portions of the sled assemblies 26, 26'. Examples of sequencing arrangements are shown in my U.S. Pat. No. 5,193,661, granted Mar. 16, 1993, and U.S. Pat. No. 5,427, 229, granted Jun. 27, 1995.

FIGS. 8A–8F detail the sequence of operation of a pair of sled assemblies 26, 26'. The two sled assemblies 26, 26' operate in conjunction with each other to move the soccer field. Depending on the size of the soccer field, the movable conveyor is provided with a multiplicity of sled assembly pairs, only some of which are shown in FIG. 1. Each sled assembly pair includes an assembly 26 and an assembly 26'. All of the sled assemblies 26 are controlled in unison and all of the sled assemblies 26' are controlled in unison, as described herein.

The soccer field is illustrated as being moved to the left in FIGS. 8A–8F, as indicated by arrows 190. As used herein, a "forward" position is a position toward the direction of movement of the load (the soccer field). A "rear" position is a position in the opposite direction.

When the conveyor is at rest, the air bags 83, 83' of all sled assemblies 26, 26' are deflated, and platform 24 and the load thereon rest on foot supports 38. To begin a conveying operation, the air bag of each assembly 26' is inflated to transfer the weight of the platform 24 and the load onto the assemblies 26'. As shown in FIG. 8A, the shoe 42 of assembly 26, with its air bag deflated, is retracted longitudinally relative to the load to a forward position, as indicated by arrow 192, by pressurizing its motor 60 with low pressure hydraulic fluid. Motor 62 is relieved to tank. Motor 62' of assembly 26' is pressurized with high pressure hydraulic fluid, and motor 60' of assembly 26' is relieved to tank. Since the shoe 42 of assembly 26' is urged against the bunker floor by the inflated air bag, longitudinal movement of the shoe 42 is inhibited and the platform and soccer field are moved in the forward direction along the shoe 42. This relative movement is indicated by arrow 194. It is slower than the retracting movement of the shoe 42 of assembly 26 because of the relatively low volume of the high pressure source 130. The use of high volume, low pressure to power the retracting movement enables rapid retraction of the shoe 42.

Referring to FIG. 8B, when motor 60 of assembly 26 reaches the end of its stroke, it is relieved to tank and the air bag of assembly 26 begins to inflate. Assembly 26' continues to move the soccer field forward. Referring to FIG. 8C, motor 62 of assembly 26 is pressurized with high pressure fluid just prior to full inflation of the air bag of assembly 26. When the air bag is fully inflated, both assemblies 26, 26', for a brief period, operate to move the soccer field in the forward direction relative to their shoes 42. This relative movement is indicated by arrows 194 in FIG. 8C.

Referring to FIG. 8D, while assembly 26 continues to move the soccer field, motor 62' of assembly 26' reaches the end of its stroke and is relieved to tank. The air bag of assembly 26' then is deflated so that assembly 26 carries the weight of the platform 24 and the soccer field. Motor 60' of assembly 26' then is pressurized with low pressure fluid. This causes shoe 42 of assembly 26' to move longitudinally relative to the field to a forward position, as indicated by arrow 192.

Referring to FIG. 8E, when motor 60' of assembly 26' reaches the end of its stroke, it is relieved to tank. The air bag of assembly 26' then is inflated, while assembly 26 continues to move the soccer field. Referring to FIG. 8F, as the air bag of assembly 26' fully inflates, motor 62' is pressurized with high pressure fluid, and both assemblies 26, 26' operate to move the soccer field in the forward direction. The cycle repeats itself, and the soccer field is moved at a uniform speed through the bunker.

The provision of a low volume, high pressure hydraulic fluid source and a high volume, low pressure hydraulic fluid source allows the sled assemblies to retract, i.e. move to a forward position, under low pressure, while the other sled assembly operates under high pressure to advance the soccer field. The high pressure provides sufficient power to move very heavy loads. The high volume, low pressure allows rapid retraction of the shoes to maintain continuous movement of the load.

While the present invention has been described and illustrated with the provision of pairs of sled assemblies, the movable conveyor of the present invention could operate with only a single set of sled assemblies provided. In such an embodiment, the soccer field would be moved incrementally, rather than continuously. The inflatable members of the sled assemblies all would inflate to raise the soccer field, and the assemblies then would move the soccer field in unison. Then all the inflatable members, in unison, would deflate, so that the soccer field would rest on the foot supports of the conveyor platform. Then the sled assemblies would retract themselves to a forward position. In their forward position, the air bags would inflate to raise the soccer field, and the process would repeat itself to convey the soccer field.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A movable conveyor for conveying a load in a longitudinal direction, comprising:
    a platform having a load receiving surface;
    a shoe positioned below the platform;
    an inflatable member positioned vertically between the platform and the shoe and mounted to move longitudinally with the platform; and
    an extensible actuator having first and second components movable relative to each other, one of which is coupled to the shoe, and the other of which is coupled to the platform;
    wherein the inflatable member has an inflated position in which it pushes upwardly on the platform to raise the platform and any load on the platform and pushes downwardly on the shoe to exert downward pressure on the shoe and inhibit longitudinal movement of the shoe when the actuator is operated to move the load, and a deflated position in which it allows the platform and the load thereon to rest on a support to allow the shoe to move longitudinally relative to the load when the actuator is operated.

2. The conveyor of claim 1, comprising a bearing positioned vertically between the shoe and the inflatable member and mounted to move longitudinally with the inflatable member, wherein the inflatable member in its inflated position pushes downwardly on the bearing, which, in turn, exerts a downward pressure on the shoe, and wherein the bearing provides a bearing surface for movement of the platform and the load along the shoe.

3. The conveyor of claim 2, wherein the bearing comprises a body of low friction material.

4. A movable conveyor for conveying a load in a longitudinal direction, comprising:
    a platform having a load receiving surface;
    a shoe positioned below the platform;
    an expandable member positioned vertically between the platform and the shoe and mounted to move longitudinally with the platform; and
    an extensible actuator having first and second components movable relative to each other, one of which is coupled to the shoe, and the other of which is coupled to the platform;
    wherein the expandable member has an expanded position in which it pushes upwardly on the platform to raise the platform and any load on the platform and pushes downwardly on the shoe to exert downward pressure on the shoe and inhibit longitudinal movement of the shoe when the actuator is operated to move the load, and a contracted position in which it allows the platform and the load thereon to rest on a support to allow the shoe to move longitudinally relative to the load when the actuator is operated; and
    wherein the conveyor comprises first and second longitudinally spaced abutments positioned longitudinally between first and second ends of the shoe, and first and second extensible units having one end coupled to the first and second ends of the shoe, respectively, and another opposite end coupled to the first and second abutments, respectively, the expandable member being positioned longitudinally between the first and second abutments, and one of the units comprising the actuator.

5. The conveyor of claim 4, wherein each of the extensible units comprises a powered actuator.

6. The conveyor of claim 5, comprising a pair of said shoes, each shoe having associated therewith its own first and second abutments, expandable member and powered actuators, and each expandable member serving, during a portion of a conveying operation, as the support to allow the shoe corresponding to the other expandable member to move longitudinally relative to the load to allow, in turn, continuous longitudinal conveyance of the load.

7. The conveyor of claim 4, comprising a pair of said shoes, each shoe having associated therewith its own first and second abutments, expandable member and first and second extensible units, and each expandable member serving, during a portion of a conveying operation, as the support to allow the shoe corresponding to the other expandable member to move longitudinally relative to the load to allow, in turn, continuous longitudinal conveyance of the load.

8. The conveyor of claim 7, wherein each expandable member is an inflatable member, and said expanded and contracted positions are inflated and deflated positions, respectively.

9. The conveyor of claim 4, comprising a bearing positioned vertically between the shoe and the expandable member, the bearing also being positioned longitudinally adjacent and between the first and second abutments, wherein the expandable member in its expanded position pushes downwardly on the bearing, which, in turn, exerts a downward pressure on the shoe, and wherein the bearing provides a bearing surface for movement of the platform and the load along the shoe.

10. The conveyor of claim 9, wherein the expandable member is an inflatable member, and said expanded and contracted positions are inflated and deflated positions, respectively.

11. The conveyor of claim 4, wherein the expandable member is an inflatable member, and said expanded and contracted positions are inflated and deflated positions, respectively.

12. A movable conveyor for conveying a load in a longitudinal direction, comprising:

a platform having a load receiving surface; and a plurality of sled assemblies, each including:

a shoe positioned below the platform;

an expandable member positioned vertically between the platform and the shoe and mounted to move longitudinally with the platform; and an extensible actuator having first and second components movable relative to each other, one of which is coupled to the shoe, and the other of which is coupled to the platform;

wherein the expandable member has an expanded position in which it pushes upwardly on the platform to raise the platform and any load on the platform and pushes downwardly on the shoe to exert downward pressure on the shoe and inhibit longitudinal movement of the shoe when the actuator is operated to move the load, and a contracted position in which it allows the platform and the load thereon to rest on a support to allow the shoe to move longitudinally relative to the load when the actuator is operated;

wherein said sled assemblies are arranged in a first group and a second group, each expandable member in each group serving, during a portion of a conveying operation, as the support to allow the shoes in the other group to move longitudinally relative to the load to allow, in turn, continuous longitudinal conveyance of the load.

13. The conveyor of claim 12, wherein each expandable member is an inflatable member, and said expanded and contracted positions are inflated and deflated positions, respectively.

14. A movable conveyor for conveying a load in a longitudinal direction, comprising:

a platform having a load receiving surface;

a shoe positioned below the platform;

an expandable member positioned vertically between the platform and the shoe and mounted to move longitudinally with the platform; and an extensible actuator having first and second components movable relative to each other, one of which is coupled to the shoe, and the other of which is coupled to the platform;

wherein the expandable member has an expanded position in which it pushes upwardly on the platform to raise the platform and any load on the platform and pushes downwardly on the shoe to exert downward pressure on the shoe and inhibit longitudinal movement of the shoe when the actuator is operated to move the load, and a contracted position in which it allows the platform and the load thereon to rest on a support to allow the shoe to move longitudinally relative to the load when the actuator is operated; and wherein the shoe has first and second end portions defining therebetween a midsection, the first and second end portions having greater rigidity than the midsection, and the expandable member being positioned vertically adjacent the midsection.

15. A movable conveyor for conveying a load in a longitudinal direction, comprising:

a platform having a load receiving surface;

a shoe positioned below the platform;

an expandable member positioned vertically between the platform and the shoe and mounted to move longitudinally with the platform;

an extensible actuator having first and second components movable relative to each other, one of which is coupled to the shoe, and the other of which is coupled to the platform; and a bearing positioned vertically between the shoe and the expandable member and mounted to move longitudinally with the expandable member;

wherein the expandable member has an expanded position in is which it pushes upwardly on the platform to raise the platform and any load on the platform and pushes downwardly on the shoe to exert downward pressure on the shoe and inhibit longitudinal movement of the shoe when the actuator is operated to move the load, and a contracted position in which it allows the platform and the load thereon to rest on a support to allow the shoe to move longitudinally relative to the load when the actuator is operated;

wherein the expandable member in its expanded position pushes downwardly on the bearing, which, in turn, exerts a downward pressure on the shoe, and wherein the bearing provides a bearing surface for movement of the platform and the load along the shoe;

wherein the bearing comprises a body of low friction material; and wherein the body of the bearing includes conduits leading to a bottom surface of the bearing, which bottom surface confronts the shoe, the conduits being adapted for channeling a fluid to a space between the bottom surface of the bearing and the confronting surface of the shoe, to create a fluid film therebetween.

16. A method of conveying a load, comprising the steps of:

(1) positioning the load on a platform;

(2) positioning a shoe under the platform, an inflatable member vertically between the platform and the shoe, and a powered actuator coupled to the shoe and the platform;

(3) inflating the inflatable member to push upwardly on the platform and raise the load and to push downwardly on the shoe;

(4) while the inflatable member is inflated, operating the actuator to move the load, the platform and the inflatable member in a longitudinal direction along the shoe;

(5) then deflating the inflatable member to allow the load to rest on a support;

(6) while the inflatable member is deflated, operating the actuator to move the shoe relative to the load, the platform and the inflatable member in the longitudinal direction; and (7) repeating steps (3)–(6) until the load has reached a desired position.

17. A method of continuously conveying a load, comprising:

(1) positioning the load on a platform;

(2) providing a plurality of sled assemblies, each including a shoe, an expandable member, and a powered actuator;

(3) for each assembly, positioning the shoe under the platform and the expandable member vertically between the platform and the shoe, and coupling the actuator to the shoe and the platform;

(4) expanding the expandable members of a first group of assemblies to push upwardly on the platform and raise the load and to push downwardly on the shoes of said first group, and allowing the expanded expandable members to support the load and simultaneously operating the actuators of the first group of assemblies to move the load, the platform, and the expandable members of the first group relative to the shoes;

(5) while the load is being moved by the first group of assemblies, contracting the expandable members of a second group of assemblies to allow the expandable members of the first group to support the load, moving the shoes of the second group relative to the load, and then expanding the expandable members of the second group and operating the actuators of the first and second groups simultaneously to move the load;

(6) while continuing operation of the actuators of the second group to move the load, contracting the expandable members of the first group and allowing the second group to support the load, then operating the actuators of the first group to move the shoes of the first group relative to the load, and then expanding the expandable members of the first group and operating the actuators of the first and second groups simultaneously to move the load; and (7) then repeating steps (5) and (6) until a desired position has been reached.

* * * * *

UNITED STATES PATENT AND TRADEMARK OFFICE
CERTIFICATE OF CORRECTION

PATENT NO: 5,762,152

DATED: June 9, 1998

INVENTOR(S): Raymond Keith Foster

It is certified that error appears in the above-identified patent and that said Letters Patent is hereby corrected as shown below:

Claim 15, column 12, line 22, after "in", delete "is".

Signed and Sealed this

First Day of December, 1998

Attest:

BRUCE LEHMAN

Attesting Officer

Commissioner of Patents and Trademarks